United States Patent
Kopka

(10) Patent No.: US 10,887,630 B2
(45) Date of Patent: Jan. 5, 2021

(54) DEVICE SUPPORTING MULTIPATH TRANSPORT CONTROL PROTOCOL AND METHOD BY WHICH DEVICE RECEIVES VIDEO DATA THROUGH STREAMING

(71) Applicant: SAMSUNG ELECTRONICS CO., LTD., Suwon-si (KR)

(72) Inventor: Piotr Kopka, Radzymin (PL)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/962,547

(22) Filed: Dec. 8, 2015

(65) Prior Publication Data

US 2016/0286251 A1 Sep. 29, 2016

(30) Foreign Application Priority Data

Mar. 25, 2015 (KR) .................. 10-2015-0041646

(51) Int. Cl.
*H04N 21/234* (2011.01)
*H04N 21/61* (2011.01)
(Continued)

(52) U.S. Cl.
CPC ... *H04N 21/23406* (2013.01); *H04L 65/4084* (2013.01); *H04L 65/4092* (2013.01); *H04L 65/80* (2013.01); *H04L 67/02* (2013.01); *H04N 21/2402* (2013.01); *H04N 21/262* (2013.01); *H04N 21/458* (2013.01); *H04N 21/6125* (2013.01); *H04N 21/64707* (2013.01)

(58) Field of Classification Search
CPC ......... H04N 21/23406; H04N 21/6125; H04N 21/64707; H04N 21/2402; H04N 21/458; H04N 21/262; H04L 67/02; H04L 65/4084; H04L 65/4092; H04L 65/80
USPC ...................... 725/93, 94, 98, 114–116, 118
See application file for complete search history.

(56) References Cited

U.S. PATENT DOCUMENTS 6,993,335 B2 1/2006 Natarajan et al.
7,555,559 B2 6/2009 Chapweske
(Continued)

FOREIGN PATENT DOCUMENTS

KR 10-2012-0096844 A 8/2012
KR 10-2013-0019509 A 2/2013
(Continued)

OTHER PUBLICATIONS

Krka, "Android's Stragefright Media Player Architecture", News & Commentary, Aug. 31, 2013, 11 total pages, retrieved from http://quandarypeak.com/2013/08/androids-stagefright-mediaplayer-architecture/.
(Continued)

Primary Examiner — Nnenna N Ekpo
(74) Attorney, Agent, or Firm — Sughrue Mion, PLLC

(57) ABSTRACT

A method for receiving video data through streaming using a device supporting a multipath transport control protocol (MPTCP) is provided. The method includes receiving the video data through a first network; calculating a buffer duration of buffered video data from among the received video data; determining whether to activate a second network based on the calculated buffer duration; and receiving the video data by using at least one from among the first network and the second network based on a result of the determining.

20 Claims, 9 Drawing Sheets

(51) Int. Cl.
  H04N 21/647    (2011.01)
  H04N 21/24     (2011.01)
  H04N 21/458    (2011.01)
  H04N 21/262    (2011.01)
  H04L 29/06     (2006.01)
  H04L 29/08     (2006.01)

(56) References Cited

U.S. PATENT DOCUMENTS

| | | | |
|---|---|---|---|
| 2008/0034393 A1* | 2/2008 | Crayford | H04N 7/17318 725/87 |
| 2008/0080412 A1* | 4/2008 | Cole | H04L 45/00 370/328 |
| 2011/0078376 A1 | 3/2011 | Deshpande et al. | |
| 2011/0296006 A1* | 12/2011 | Krishnaswamy | H04L 45/00 709/224 |
| 2012/0057457 A1 | 3/2012 | Ahmadi | |
| 2012/0184323 A1* | 7/2012 | Hara | H04W 76/048 455/525 |
| 2013/0095806 A1* | 4/2013 | Salkintzis | H04L 65/601 455/414.3 |
| 2013/0103849 A1* | 4/2013 | Mao | H04N 21/8456 709/231 |
| 2013/0232534 A1* | 9/2013 | Salkintzis | H04L 47/762 725/116 |
| 2013/0304875 A1 | 11/2013 | Kaspar et al. | |
| 2013/0308919 A1* | 11/2013 | Shaw | H04N 21/2221 386/239 |
| 2014/0066046 A1* | 3/2014 | Keshavdas | H04W 72/085 455/419 |
| 2014/0139687 A1* | 5/2014 | Adams | H04N 17/004 348/192 |
| 2016/0149916 A1* | 5/2016 | Lindheimer | H04L 63/162 726/4 |
| 2016/0182581 A1* | 6/2016 | Petria | H04L 65/4069 709/231 |
| 2017/0208104 A1* | 7/2017 | Wei | H04L 29/06 |
| 2018/0184474 A1* | 6/2018 | Skog | H04L 67/14 |

FOREIGN PATENT DOCUMENTS

| | | |
|---|---|---|
| KR | 10-1243737 B | 3/2013 |
| KR | 10-2014-0127744 A | 11/2014 |
| KR | 10-2015-0021288 A | 3/2015 |
| KR | 10-2015-0096917 A | 8/2015 |

OTHER PUBLICATIONS

"Welcome to the Android Open Source Project!", Android Open Source Project Home Page, 2 total pages, retrieved from <https://source.android.com>.

Wischik et al., "Design, implementation and evaluation of congestion control for multipath TCP", University College London, 14 total pages.

Wamser et al, "Dynamic Bandwidth Allocation for Multiple Network Connections: Improving User QoE and Network Usage of YouTube in Mobile Broadband", Institute of Computer Science, Universitat Wurzburg, 2014, 19 total pages.

"Live Encoder Settings, Bitrates and Resolutions", Live Streaming Guide, 2014, 7 total pages, retrieved from https://support.google.com/youtube/answer/2853702?hl=enurl:http://web.archive.org/web/20140818124624/https://support.google.com/youtube/answer/2853702?hl=en.

Barre, "Implementation and Assessment of Modern Host-based Multipath Solutions", Louvain School of Engineering, Oct. 22, 2011, 165 total pages.

Siris et al., "Improving Mobile Video Streaming with Mobility Prediction and Prefetching in Integrated Cellular-WiFi Networks", Mobile Multimedia Laboratory, Department of Informatics, Athens University of Economics and Business, Oct. 23, 2013, 7 total pages.

"Download Speeds: What do 2G, 3G and 4G actually mean for you?", Ken's Tech Tips, 4 total pages, retrieved from http://kenstechtips.com/index.php/download-speeds-2g-3g-and-4g-actual-meaning.

"Welcome to the Linux Kernel Multipath TCP project", MultiPath TCP—Linux Kernel Implementation, 4 total pages, retrieved from http://www.multipath-tcp.org/.

Barre et al., "MulitPath TCP: From Theory to Practice", University of Catholic Louvain, May 9, 2011, 29 total pages.

Volkert et al., "Multipath Video streaming Based on Hierarchical Routing Management", A. Logical Streams, 6 total pages.

Dimopoulos et al., "Multi-Source Mobile Video Streaming: Load Balancing, Fault Tolerance, and Offloading with Prefetching", Mobile Multimedia Laboratory, Department of Informatics, 10 total pages.

"NetPerfMeter: A Network performance Metering Tool", Multipath TCP, SCTP and MPTCP protocol performance analyses, Sep. 7, 2015, 9 total pages, retrieved from http://blog.multipathtcp.org/blog/html/index.html.

Song et al., "Performance Analysis of Probabilistic Multipath Transmission of Video Streaming Traffic over Multi-Radio Wireless Devices", IEEE Transactions on Wireless Communications, vol. 11, No. 4, Apr. 2012, pp. 1554-1564.

Singh et al, "Predictive Buffering for Streaming Video in 3G Networks", IEEE, 2012, 10 total pages.

Raiciu, "The Mobile Kibbutz", Trilogy 2, 23 total pages.

Staehle et al., "YoMo: A YouTube Application Comfort Monitoring Tool", Institute of Computer Science, University of Wuzburg, 3 total pages.

* cited by examiner

FIG. 5

| Resolution   | 426×240 | 640×360  | 854×480  | 1280×720 | 1920×1080 |
|---|---|---|---|---|---|
| Recommended  | 400kbps | 750kbps  | 1000kbps | 2500kbps | 4500kbps  |
| Minimum      | 300kbps | 400kbps  | 500kbps  | 1500kbps | 3000kbps  |
| Maximum      | 700kbps | 1000kbps | 2000kbps | 4000kbps | 6000kbps  |

DEVICE SUPPORTING MULTIPATH TRANSPORT CONTROL PROTOCOL AND METHOD BY WHICH DEVICE RECEIVES VIDEO DATA THROUGH STREAMING

CROSS-REFERENCE TO RELATED APPLICATION

This application claims priority from Korean Patent Application No. 10-2015-0041646, filed on Mar. 25, 2015 in the Korean Intellectual Property Office, the disclosure of which is incorporated herein in its entirety by reference.

BACKGROUND

1. Field

Apparatuses and methods consistent with exemplary embodiments relate to a device supporting a multipath transport control protocol (MPTCP) and a method by which a device receives video data through streaming.

2. Description of the Related Art

Streaming services in which video is transmitted via mobile communication networks are in wide use. Generally, the streaming service is a type of multimedia service in which multimedia data is played back on a user terminal and then removed without storing the multimedia data in a storage device. While streaming services are widely used even in wired communication networks, the streaming services are very useful for mobile communication terminals such as cellular phones which can lack separate storage spaces.

Along with the rapid progress in these streaming techniques, a real-time Internet protocol television (IPTV) service and a video on demand (VOD) service have been revitalized, and in particular the use of streaming services via wireless networks has rapidly increased, at least in part due to the popularization of mobile devices.

In general, a streaming service largely depends on a network state. The larger the screen of a mobile device, and the better the performance of the processor of the mobile device, the higher the quality of videos needed, and thus a stable and efficient wireless network for receiving and playing back a high-quality video through streaming is required. However, since network use frequency, degree, and pattern vary for each user, a network state varies greatly according to, for example, place and a time. In addition, mobile devices may use a wireless network scheme for a streaming service, and wireless networks may have a high possibility of variation in communication signal due to the occurrence of fading, interference, and the like according to environmental factors. As a result, state variation of wireless networks is much larger than that of wired networks.

Along with the popularization of various communication interfaces, such as Wi-Fi, third generation (3G), long term evolution (LTE), and the like, in mobile devices using wireless networks, a multipath transport control protocol (MPTCP) has been researched as a method of increasing transmission efficiency by simultaneously using a plurality of network paths in a mobile device.

SUMMARY

Exemplary embodiments provide a multipath transport control protocol (MPTCP) and a method by which a device receives video data through streaming.

According to an aspect of an exemplary embodiment, there is provided a method for receiving video data through streaming using a device supporting a multipath transport control protocol (MPTCP), the method including receiving the video data through a first network; calculating a buffer duration of buffered video data from among the received video data; determining whether to activate a second network based on the calculated buffer duration; and receiving the video data by using at least one from among the first network and the second network.

The determining of whether to activate the second network may include comparing the calculated buffer duration with a predetermined reference time.

The determining of whether to activate the second network may include determining to deactivate the second network if the calculated buffer duration is greater than a first predetermined time, the first predetermined time indicating an amount of buffer duration at which playback of the video data is to be started.

The determining of whether to activate the second network may include determining to activate the second network based on a first predetermined time associated with the calculated buffer duration, and a second predetermined time associated with the calculated buffer duration, wherein the second predetermined time indicates an amount of buffer duration at which playback of the video data is to be stopped.

The method may further include receiving information about a bit rate of the video data through the first network, wherein the calculating of the buffer duration may include calculating a buffer duration of the received video data using the received information about the bit rate.

The method may further include measuring a transmission speed of the first network when the video data is received through the first network, wherein the determining of whether to activate the second network may include determining whether to activate the second network based on the measured transmission speed of the first network.

The determining of whether to activate the second network may include determining to activate the second network if the measured transmission speed of the first network is less than a predetermined reference speed.

The method may further include adjusting the predetermined reference time based on the determination.

The adjusting of the predetermined reference time may include decreasing the predetermined reference time if the second network is activated and increasing the predetermined reference time if the second network is deactivated.

According to an aspect of another exemplary embodiment, there is provided a non-transitory computer-readable recording medium may have recorded thereon a computer-readable program for performing the method.

According to an aspect of another exemplary embodiment, there is provided a device supporting a multipath transport control protocol (MPTCP), the device including a communication interface configured to receive video data streamed through a first network; and a processor configured to calculate a buffer duration of buffered video data from among the received video data, wherein the processor determines whether to activate a second network based on the calculated buffer duration, and controls the communication interface to receive the video data through at least one from among the first network and the second network according to the determination.

The processor may be further configured to determine whether to activate the second network by comparing the calculated buffer duration with a predetermined reference time.

The processor may be further configured to determine to deactivate the second network if the calculated buffer duration is greater than a first predetermined time, the first predetermined time indicating an amount of buffer duration at which playback of the video data is to be started.

The processor may be further configured to determine to activate the second network based on a first predetermined time associated with the calculated buffer duration, and a second predetermined time associated with the calculated buffer duration, wherein the second predetermined time indicates an amount of buffer duration at which playback of the video data is to be stopped.

The communication interface may be further configured to receive information about a bit rate of the video data, and the processor may be further configured to calculate a buffer duration of the received video data using the received information about the bit rate.

The processor may be further configured to measure a transmission speed of the first network when the video data is received through the first network, and determine whether to activate the second network based on the measured transmission speed.

The processor may be further configured to determine to activate the second network if the measured transmission speed is less than a predetermined reference speed.

The processor may be further configured to adjust the predetermined reference time based on the determination.

The processor may be further configured to decrease the predetermined reference time if the second network is activated and to increase the predetermined reference time if the second network is deactivated.

According to an aspect of another exemplary embodiment, there is provided a device supporting a multipath transport control protocol (MPTCP), the device including a communication interface configured to receive video data streamed through a first network; and a processor configured to activate a second network based on a buffer duration of buffered video data from among the received video data, and to control the communication interface to receive the video data using at least one from among the first network and the second network.

According to an aspect of another exemplary embodiment, there is provided a method for receiving video data, the method including receiving a first portion of the video data through a first network; buffering the first portion; calculating a buffer duration based on the buffered first portion; if the buffer duration is greater than a predetermined buffer duration, receiving a second portion of the video data through the first network; and if the buffer duration is not greater than the predetermined buffer duration, receiving the second portion of the video data through the first network and a second network.

BRIEF DESCRIPTION OF THE DRAWINGS

The above and/or other aspects will become apparent and more readily appreciated from the following description of exemplary embodiments, taken in conjunction with the accompanying drawings in which:

FIG. 5 illustrates a table of bit rates according to resolutions of a video;

DETAILED DESCRIPTION

Figure 1:
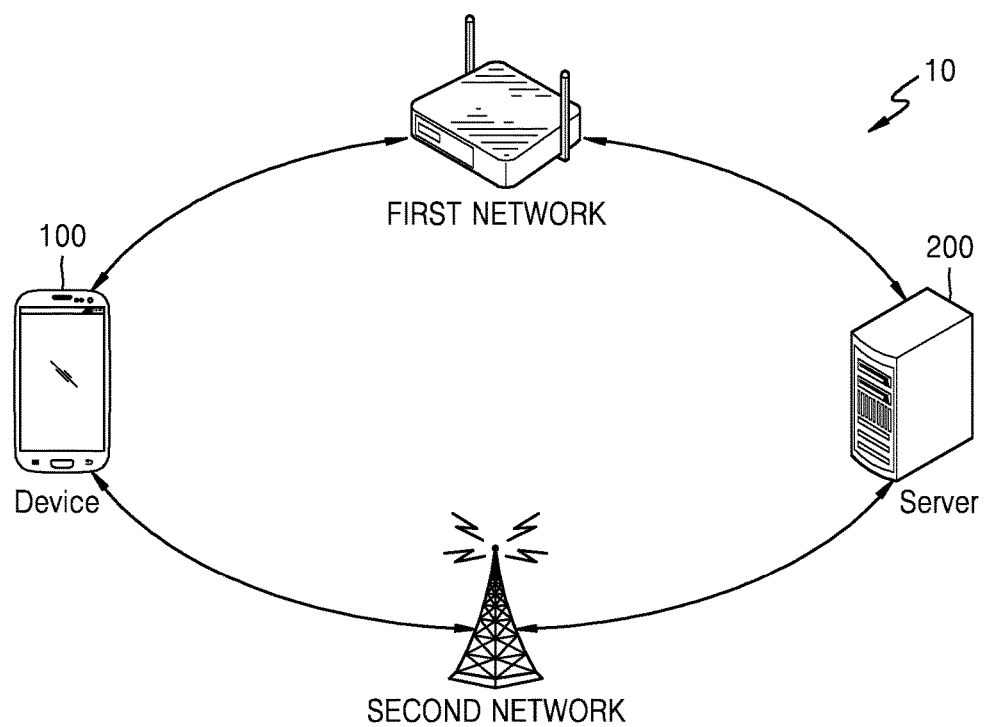
FIG. 1 illustrates a system including a device supporting a multipath transport control protocol (MPTCP), according to an exemplary embodiment.

Exemplary embodiments will now be described in detail with reference to the accompanying drawings, wherein like reference numerals refer to like elements throughout. In this regard, the present exemplary embodiments may have different forms and should not be construed as being limited to the descriptions set forth herein. In the drawings, parts irrelevant to the description are omitted to clearly describe the exemplary embodiments. Accordingly, the exemplary embodiments are merely described below, by referring to the figures, to explain aspects thereof.

In the specification, 'an embodiment' and various modifications of this expression may indicate that a specific feature, structure, and characteristic related to the embodiment are included in at least one exemplary embodiment. Thus, the expression 'in an embodiment' and arbitrary other modifications disclosed in the entire specification do not necessarily indicate the same exemplary embodiment.

Throughout the specification, when it is described that a certain part is "connected" to another part, the certain part may be "directly connected" to another part or "electrically connected" to another part by interposing another component therebetween. In addition, when a certain part "includes" a certain component, this indicates that the part may further include another component instead of excluding another component unless there is different disclosure.

As used herein, expressions such as "at least one of," when preceding a list of elements, modify the entire list of elements and do not modify the individual elements of the list.

Exemplary embodiments will now be described in detail with reference to the accompanying drawings.

FIG. 1 illustrates a system 10 including a device 100, which may support a multipath transport control protocol (MPTCP), according to an exemplary embodiment t.

Referring to FIG. 1, the system 10 may include the device 100 supporting the MPTCP and a server 200.

The server 200 may store video data which the device 100 desires to play back and may be an external device.

The device 100 may be one of various types of devices capable of using a wireless network. For example, the device 100 may be implemented by a cellular phone, a smartphone, a laptop computer, a tablet device, an e-book device, a digital broadcast device, a personal digital assistant (PDA), a portable multimedia player (PMP), a navigation machine, or any other device as desired.

The device 100 may transmit and receive data via a wireless network by simultaneously using various network paths such as Wi-Fi, third generation (3G), long term evolution (LTE), and the like through the MPTCP. For example, as shown in FIG. 1, the device 100 may receive video data by using both a first network and a second network when receiving the video data.

The first network may be a wireless local area network (WLAN) accessed via an access point (AP), and the second network may be a mobile network such as 3G or fourth generation (4G). The first network and the second network may differ from each other in terms of transmission charge or cost, for example a monetary cost required for transmission, as well as energy charge or cost. In some exemplary embodiments, energy charge or cost may refer to, for example, an amount of energy or power required by the device 100 to perform a data transmission function or a data reception function. Therefore, the device 100 supporting the MPTCP may control reception of video data via the first network and the second network, thereby increasing efficiency of data reception.

In detail, the device 100 may receive video data via the first network having an advantage in terms of cost and calculate a buffer duration of buffered video data from among the received video data.

A buffer duration of a video is information about a buffering amount of a buffer for temporarily storing received video data and may indicate a buffering amount calculated in units of time. For example, the device 100 may receive information about a bit rate of a video via the first network and calculate a buffer duration of the video by using the received information about the bit rate. The device 100 may determine whether to activate the second network, based on the calculated buffer duration.

Activation of the second network may indicate reception of video data via the second network. That is, the device 100 supporting the MPTCP may be already connected to the first network and the second network. In this case, if the second network is activated, the device 100 may receive video data via the already connected second network.

The device 100 may determine whether to activate the second network by comparing the calculated buffer duration with a predetermined reference time. For example, the device 100 may deactivate the second network if the buffer duration is greater than a first predetermined time. The first predetermined time may be a reference time for starting playback of a video as a reference for the buffer duration.

In addition, the device 100 may determine whether to activate the second network with reference to the first predetermined time and a second predetermined time based on the buffer duration. The second predetermined time may be a reference time for stopping playback of a video as a reference for the buffer duration.

A detailed description of the first predetermined time and the second predetermined time will be given below with reference to FIG. 3.

The device 100 may deactivate the second network to increase the efficiency of charge or cost efficiency if a transmission speed of the first network is sufficiently fast and activate the second network to receive video data through streaming for seamless playback of a video, based on a buffer duration of currently buffered video data.

In addition, to more quickly determine whether to activate the second network the device 100 may measure a transmission speed of the first network when data, for example, metadata, of a video desired to be played back via the first network starts to be received. The data of the video desired to be played back may include metadata or video data of the video.

The device 100 may determine whether to activate the second network based on the measured transmission speed of the first network. For example, the device 100 may determine that the second network should be activated if the measured transmission speed of the first network is less than a predetermined reference speed.

The predetermined reference speed may indicate a speed required to receive and play back a seamless video through streaming. A detailed description of the predetermined reference speed will be given below with reference to FIGS. 4 and 5.

The device 100 may determine whether to activate the second network, based on a transmission speed of the first network in an initial buffering operation, thereby further increasing reception efficiency of video data. For example, when data starts to be received, metadata of a video may be the first data received. The device 100 may calculate a buffer duration by using information about a bit rate of the video, which may be included in the metadata, after receiving the metadata. Therefore, the device 100 may determine whether to activate the second network based on a transmission speed of the first network, to quickly determine whether to activate the second network even before receiving the metadata.

In addition, if it is determined whether the second network should be activated, the device 100 may dynamically adjust the predetermined reference time based on the determination. In detail, the device 100 may decrease the predetermined reference time if the second network is activated and increase the predetermined reference time if the second network is deactivated.

The device 100 may reduce a possibility of stopping playback of a video by adaptively adjusting the predetermined reference time while receiving video data through streaming and simultaneously playing back a received video. The device 100 may prevent a decrease in quality of the video caused by frequent pauses.

For example, the device 100 may adjust the first predetermined time that may be a reference time for starting playback of a video and the second predetermined time that may be a reference time for stopping playback of the video according to whether the second network is activated. The device 100 may reduce the first predetermined time and the second predetermined time if the second network is activated.

Figure 2:
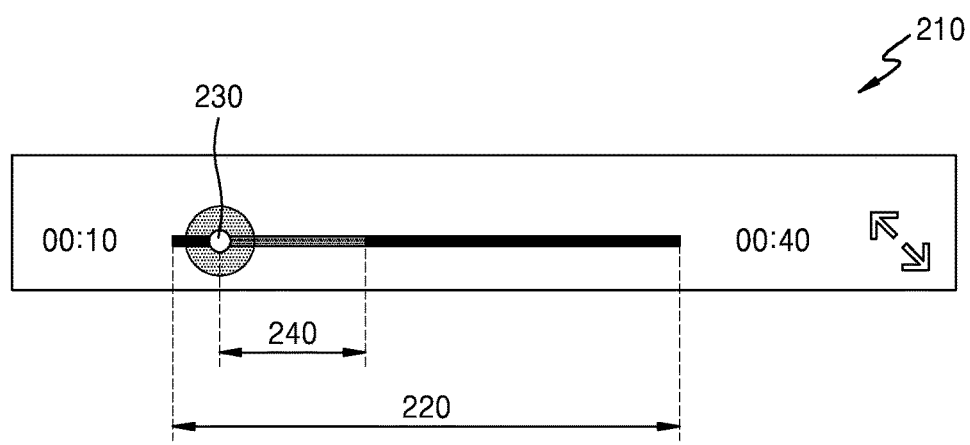
FIG. 2 illustrates an operation of calculating a buffer duration of a video in the device, according to an exemplary embodiment.

FIG. 2 illustrates an operation of calculating a buffer duration of a video in the device 100, according to an exemplary embodiment.

Referring to FIG. 2, an example of a user interface which may be displayed when the device 100 plays back a video is shown. For example, the user interface may include a playback bar 210.

The playback bar 210 may indicate information about the video being currently played back. For example, the playback bar 210 may indicate a total length 220 of the video being currently played back. In addition, the playback bar 210 may indicate a current playback point 230 in the total length 220 of the video. When the device 100 receives and plays back the video through a streaming scheme, the playback bar 210 may further indicate a buffer duration 240 of received video data from among the entire video data.

The buffer duration 240 of video data may be information about a buffering amount of a buffer for temporarily storing received video data. That is, the buffer duration 240 may indicate a temporarily stored buffering amount as time information. For example, if a buffering amount of the video being currently played back is the buffer duration 240 of 5 seconds, the playback bar 210 may indicate the buffer duration 240 of 5 seconds distinctively from the total length 220 of the video.

When the device 100 plays back video data stored therein instead of the streaming scheme or when all the video data is received and buffered, the buffer duration 240 may be a duration from the current playback point 230 to the last point of the video.

The device 1000 may calculate the buffer duration 240 of buffered video data among the received video data. For example, the buffer duration 240 may be calculated based on an amount of the buffered video data and a bit rate of the video. A unit of the amount of the buffered video data may be, for example, a byte, and a unit of the bit rate of the video may be, for example, bits/second (bps). A unit of the buffer duration 240 may be, for example, a second, millisecond, microsecond, or the like.

The device 1000 may calculate the buffer duration 240 by measuring a real-time amount of buffered video data received via the first network. If the second network is activated, the device 1000 may calculate the buffer duration 240 by measuring a real-time amount of buffered video data received via at least one of the first network and the second network.

In addition, when data starts to be received via the first network, the device 100 may receive metadata of the video. The device 100 may calculate the buffer duration 240 by using information about the bit rate of the video, which may be included in the received metadata.

Figure 3:
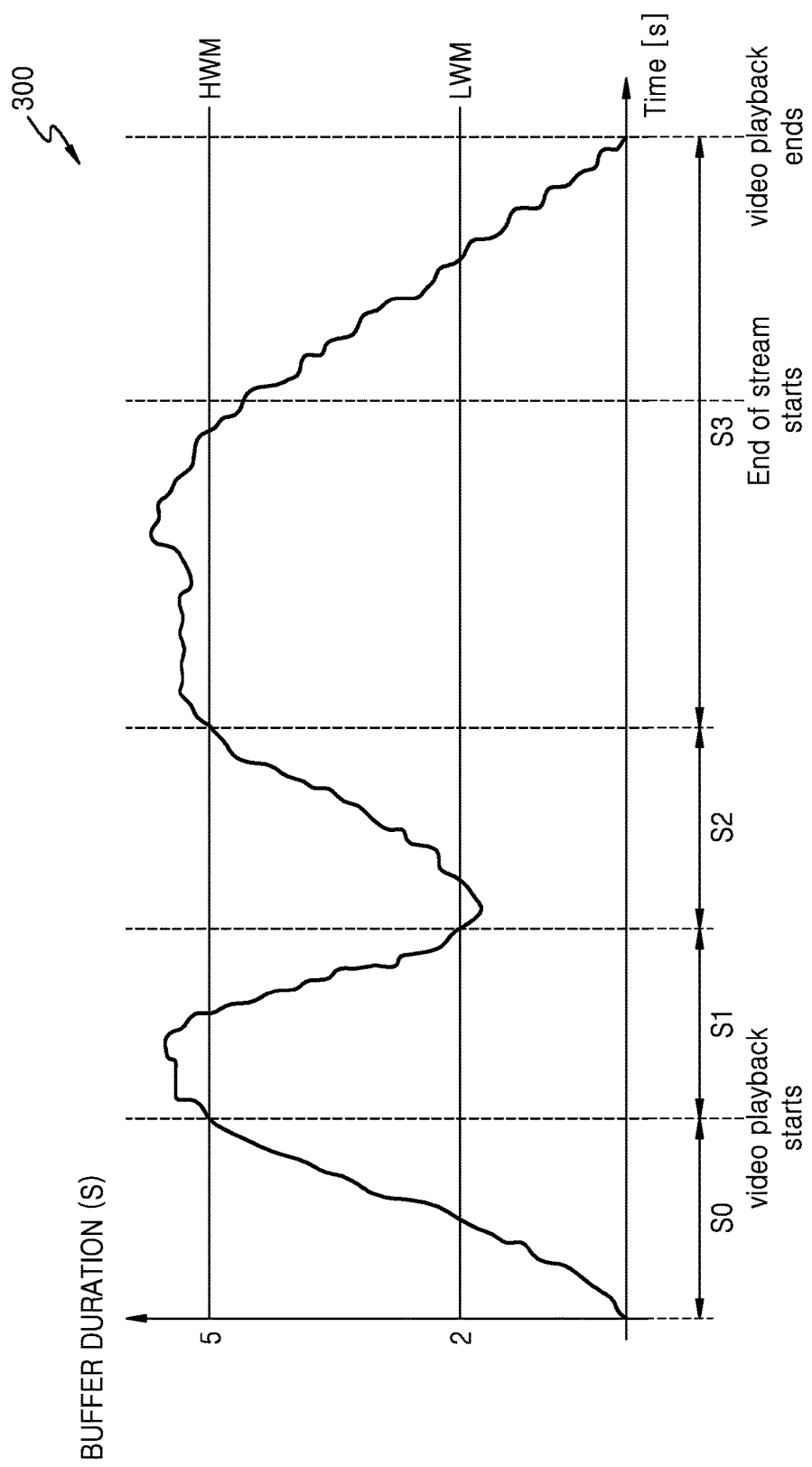
FIG. 3 illustrates a graph for describing an operation of playing back a video according to a streaming scheme in the device, according to an exemplary embodiment.

FIG. 3 illustrates a graph 300 for describing an example operation of playing back a video according to the streaming scheme in the device 100, according to an exemplary embodiment.

Referring to FIG. 3, the graph 300 indicates a buffer duration of the video along time. An X axis of the graph 300 is a time axis having a unit of second, and a Y axis thereof indicates the buffer duration having a unit of second.

In the graph 300, operation S0 is an operation of starting to receive video data. Operation S0 may be an initial buffering duration. At this time, the device 100 may be in a state of stopped or paused playback of the video in an initial operation. In operation S0, the device 100 may receive video data from the server 200 and buffer the video data in a buffer for temporarily storing the video data.

If a buffering amount is greater than or equal to a predetermined value, the device 100 may start playback of the video. For example, if a buffer duration calculated based on the buffering amount is greater than or equal to the first predetermined time, the device 100 may start playback of the video. The first predetermined time may be a high water-mark (HWM) that is a reference time for starting playback of a video. For example, the first predetermined time may be 5 seconds.

When the device starts playback of the video, operation S1 starts. In operation S1, the buffer duration may decrease or increase according to a reception and buffering speed of video data. For example, if an amount of video data played back and removed from the buffer over time is greater than an amount of newly buffered video data, the buffer duration may decrease. The device 100 may play back the video until the buffer duration decreases and then becomes less than the second predetermined time.

If the buffer duration is less than the second predetermined time, the device 100 may stop playback of the video in operation S2. In this case, the stop of playback may be a pause. The second predetermined time may be a low water-mark (LWM) that is a reference time for stopping playback of the video. For example, the second predetermined time may be 2 seconds. To prevent a decrease in quality of the video caused by frequent pauses, the device 100 may maintain a pause state until the buffer duration becomes greater than or equal to the first predetermined time.

If the buffer duration becomes greater than or equal to the first predetermined time again, the device 100 may resume playback of the video in operation S3.

The device 100 may repetitively pause and resume playback of the video according to an increase or decrease in the buffer duration.

In addition, if an end of stream (EOS) state starts, the device 100 may not pause playback of the video even though the buffer duration is less than or equal to the second predetermined time. The EOS state indicates an end portion of the video, and information about the EOS state may be included in metadata of video data. For example, the metadata of the video may include information about a total playback length or a total data size of the video.

In the EOS state, the device 100 may not pause playback of the video even though the buffer duration is less than or equal to the second predetermined time during playback of the video. In addition, when the EOS state starts during a pause in playback of the video, the device 100 may resume playback of the video even though the buffer duration is not greater than or equal to the first predetermined time.

In the graph 300, a playback duration of the video corresponds to operations S1 and S3.

Figure 4:
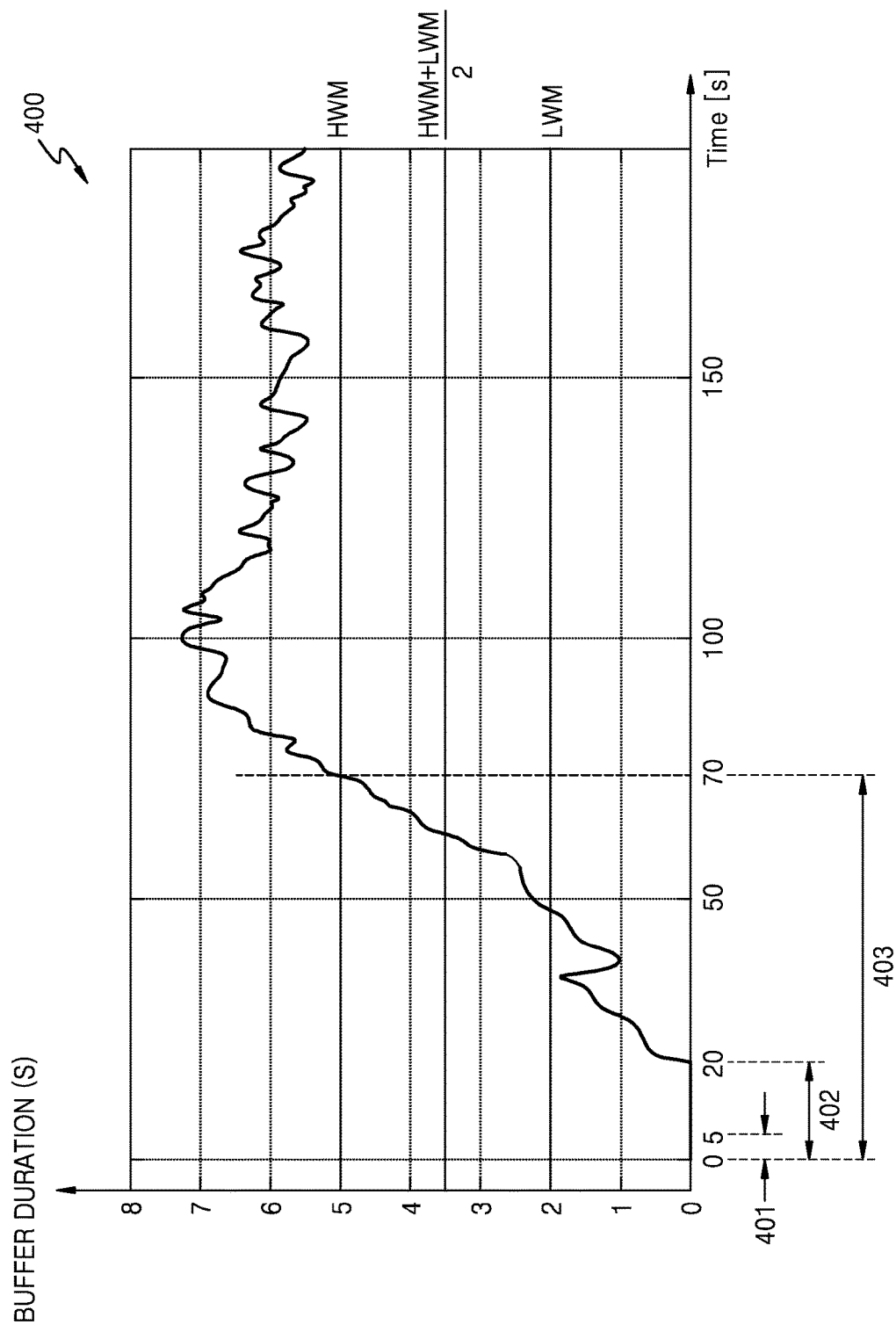
FIG. 4 illustrates a graph for describing a method by which the device supporting the MPTCP receives video data through streaming, according to an exemplary embodiment.

FIG. 4 illustrates a graph for describing a method by which the device 100 supporting the MPTCP receives video data through streaming, according to an exemplary embodiment.

Referring to FIG. 4, a graph 400 indicates a buffer duration of a video along time. An X axis of the graph 400 is a time axis having a unit of second, and a Y axis thereof indicates the buffer duration having a unit of second.

According to an exemplary embodiment, if a video playback request is received, the device 100 may receive video data by using the MPTCP. The device 100 supporting the MPTCP may transmit and receive data by simultaneously using various network paths such as Wi-Fi, 3G, LTE, and the like. For example, the device 100 may use the first network that is a WLAN and the second network that is a mobile network.

In detail, the device 100 may receive video data by accessing, using the first network, the server 200 in which the video data is stored. Referring to the graph 400, the device 100 may start to receive data related to the video via the first network at 0 second.

In the graph 400, a time duration 401 may be a minimum time for measuring a transmission speed of the first network. In addition, a time duration 402 may be a time for receiving metadata including information about a bit rate of the video via the first network. In addition, a time duration 403 (0 to 70 seconds) may be an initial buffering duration of the video.

The device 100 may receive the metadata of the video from 0 second via the first network. If the transmission of the metadata is completed in the time duration 402 (0 to 20 seconds), the device 100 may receive video data.

In this case, to calculate the buffer duration, the time duration 402 is supposed to end, and thus, the device 100 may quickly determine whether to activate the second network by measuring the transmission speed of the first network before the time duration 402 ends. For example, the device 100 may measure the transmission speed of the first network in the time duration 401 (0 to 5 seconds) and determine whether to activate the second network based on the transmission speed of the first network, when the time duration 401 ends.

In detail, the device 100 may compare the measured transmission speed of the first network with a predetermined reference speed and activate the second network if the transmission speed of the first network is less than the predetermined reference speed.

The predetermined reference speed may indicate a speed required to receive and play back a seamless video through streaming. For example, the predetermined reference speed may be pre-defined as 2500 Kbits/s. The predetermined reference speed may be pre-defined by taking into account bit rates according to generally used video resolutions.

FIG. 5 illustrates an example table of bit rates according to resolutions of a video.

Referring to FIG. 5, an example of a recommended bit rate, a minimum bit rate, and a maximum bit rate are shown for each resolution of a video. For example, 2500 Kbits/s which may cover bit rates of videos of most resolutions among recommended bit rates may be determined as the predetermined reference speed.

Referring back to FIG. 4, the device 100 may determine that the second network should be activated if the transmission speed of the first network is less than 2500 Kbits/s. For example, the time duration in which the second network is activated may be 5 to 70 seconds in the graph 400.

The device 100 may receive data via the first network and the second network from when the time duration 401 ends. For example, the device 100 may receive metadata via the first network and the second network until the time duration 402 ends and receive video data after receiving the metadata.

The device 100 may calculate a buffer duration of buffered video data among the received video data. The device 100 may calculate the buffer duration based on a buffering amount of the received video data, a buffering amount of the buffered video data, and a bit rate of the video. Referring to the graph 400, the device 100 receives video data in the initial buffering duration 403, thereby increasing the buffer duration.

If the buffer duration becomes greater than or equal to the first predetermined time, the device 100 may determine that the second network should be deactivated. The first predetermined time is a reference for the buffer duration and may be a reference time for starting playback of the video. In detail, at 70 seconds, the device 100 may start playback of the video and determine that video data is received only via the first network by deactivating the second network.

If the device 100 plays back the video, the buffer duration may increase or decrease according to a transmission speed of video data. If the buffer duration decreases and then becomes less than or equal to a third predetermined time, the device 100 may activate the second network again to receive video data via the second network.

The third predetermined time may be a reference time for deactivating the second network, and the device 100 may determine the third predetermined time by taking into account the first predetermined time and the second predetermined time. In detail, the third predetermined time may be less than the first predetermined time and greater than the second predetermined time that is a reference time for stopping playback of the video. For example, the third predetermined time may be a mean value of the first predetermined time and the second predetermined time. However, the third predetermined time is not limited thereto and may be determined differently according to settings of a user, a network state, or the like.

The device 100 may efficiently use the second network to receive the video by determining whether the second network should be activated, based on the first predetermined time that is a reference time for activating the second network and the third predetermined time that is a reference time for deactivating the second network.

Figure 6:
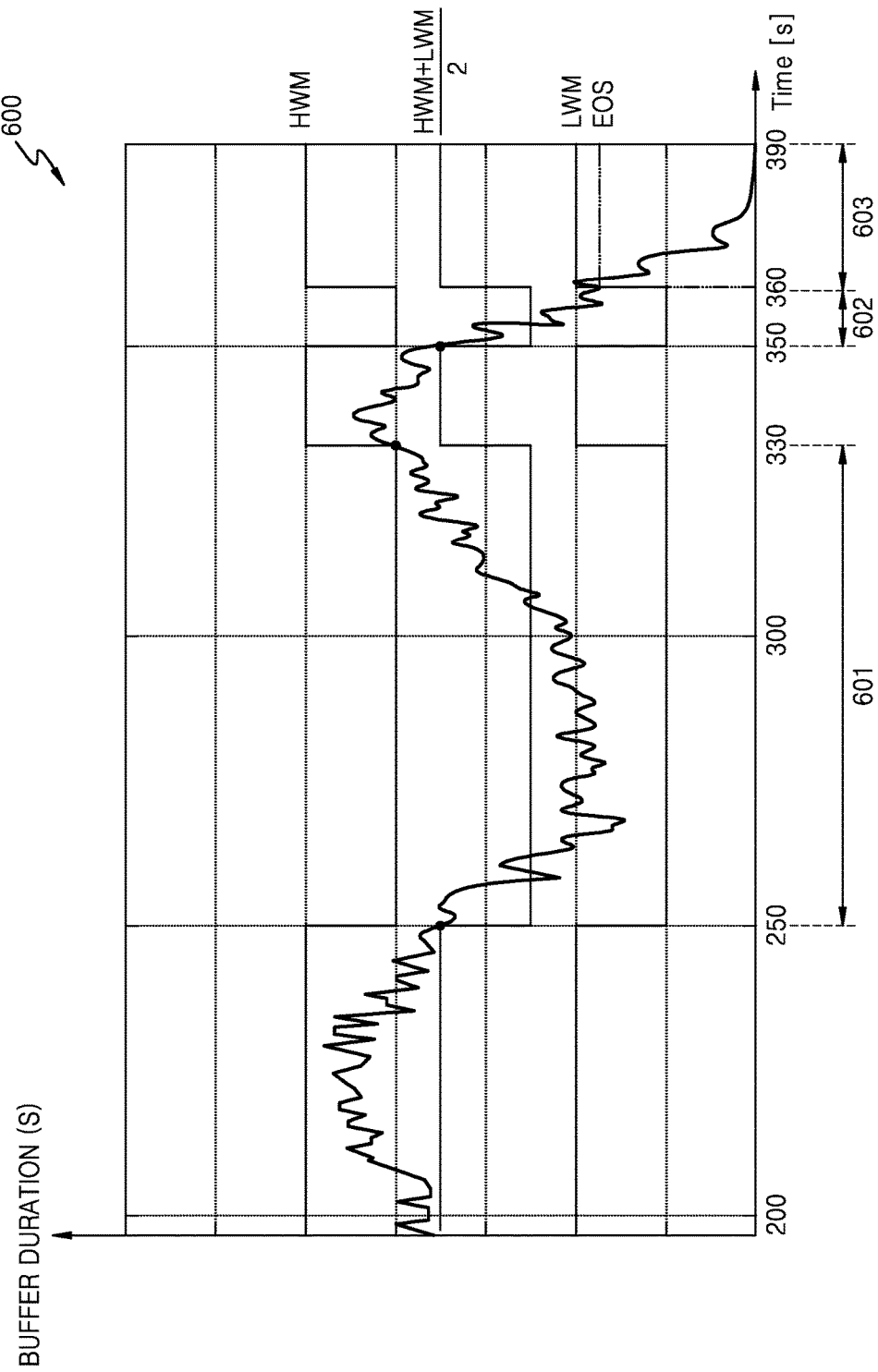
FIG. 6 illustrates a graph for describing a method by which the device receives video data through streaming, according to another exemplary embodiment.

FIG. 6 illustrates a graph 600 for describing a method by which the device 100 receives video data through streaming, according to another exemplary embodiment.

Referring to FIG. 6 the graph 600 indicates an example of a buffer duration of a video over time. An X axis of the graph 600 is a time axis having a unit of second, and a Y axis indicates the buffer duration having a unit of second.

The graph 600 shows the buffer duration over time after an initial buffering duration, wherein a video may be being played back at 200 seconds.

In the graph 600, a time duration 601 (250 to 330 seconds) and a time duration 602 (350 to 360 seconds) correspond to a time duration in which the second network is activated. A time duration 603 (360 to 390 seconds) corresponds to a time duration of the EOS state.

The device 100 may dynamically adjust the predetermined reference time based on the determination of whether to activate the second network. The predetermined reference time may include the first predetermined time and the second predetermined time.

In detail, if the second network is activated, the device 100 may decrease the first predetermined time and the second predetermined time. If the second network is deactivated, the device 100 may increase the first predetermined time and the second predetermined time. The device 100 may adaptively adjust the predetermined reference time based on the determination of whether to activate the second network thereby reducing an unnecessary stoppage of playback to prevent a decrease in quality of the video caused by frequent pauses.

According to the graph 600, if the buffer duration decreases to be less than or equal to the third predetermined time at 250 seconds, the device 100 may receive video data via the second network by activating the second network. If the second network is activated, the device 100 may decrease the first predetermined time and the second predetermined time. According to the decrease in the first predetermined time and the second predetermined time, the third predetermined time may also decrease.

For example, if the second predetermined time decreases from 2 seconds to 1 second, the device 100 does not stop playback of the video if the buffer duration is 1 second or more. If video data is received via the second network, the buffer duration may not be less than 1 second, thereby continuously playing back the video.

In the time duration 601, if the device receives video data via the first network and the second network, the buffer duration may increase. If the buffer duration becomes greater than or equal to the decreased first predetermined time, the device 100 may deactivate the second network at 330 seconds. If the second network is deactivated, the device 100 may increase the previously decreased first predetermined time and the previously decreased second predetermined time again. Based on the increase in the first predetermined time and the second predetermined time, the third predetermined time may also increase.

If the buffer duration decreases to be less than or equal to the increased third predetermined time at 350 seconds, the device 100 may activate the second network and decrease the first predetermined time and the second predetermined time. The device 100 may receive video data via the second network starting at 350 seconds.

In some exemplary embodiments, if playback of video data enters the EOS state (the time duration 603) at 360 seconds, the device 100 may deactivate the second network regardless of the buffer duration. The device 100 may receive video data only using the first network from 360 seconds.

The EOS state may indicate an end portion of the video, and information about the EOS state may be included in metadata of video data. For example, metadata of the video may include information about a total playback length or a total data size of the video.

In the EOS state, the device 100 may not pause playback of the video even though the buffer duration is less than or equal to the second predetermined time during playback of the video. In addition, when the EOS state starts during a pause in playback of the video, the device 100 may resume playback of the video even though the buffer duration is not greater than or equal to the first predetermined time.

The device may dynamically adjust the predetermined times that are reference times of the buffer duration, thereby increasing reception efficiency of video data and preventing frequent playback pauses.

Figure 7:
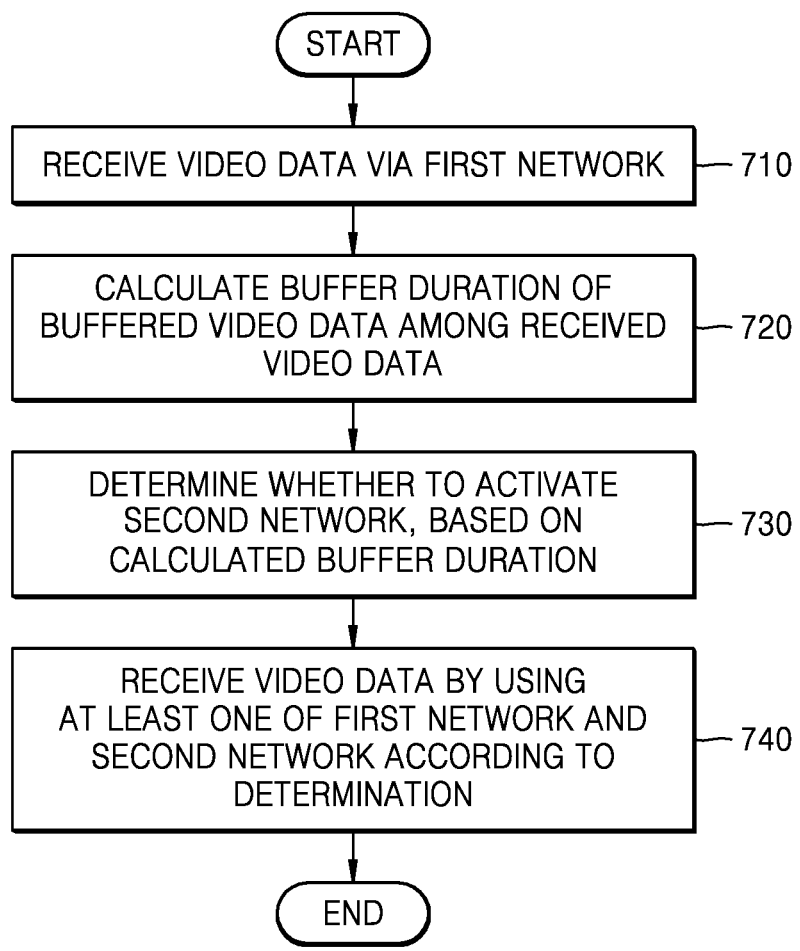
FIG. 7 illustrates a flowchart of a method by which the device receives video data through streaming, according to an exemplary embodiment.

FIG. 7 illustrates a flowchart of a method by which the device 100 receives video data through streaming, according to an exemplary embodiment.

In operation 710, the device 100 may receive video data via the first network.

The device 100 may receive metadata and video data as data of a video desired to be played back. For example, the device 100 may receive the metadata of the video and thereafter receive the video data via the first network.

In operation 720, the device 100 may calculate a buffer duration of buffered video data from among the received video data.

The buffer duration may be information about a buffering amount of a buffer for temporarily storing the received video data and may indicate a buffering amount calculated according to a time unit. For example, the device 100 may receive information about a bit rate of a video via the first network and calculate a buffer duration of the video by using the received information about the bit rate.

In operation 730, the device 100 may determine whether to activate the second network, based on the calculated buffer duration.

The activation of the second network may indicate that the device 100 receives video data via the second network. That is, the device 100 supporting the MPTCP may be previously connected to the first network and the second network. In this case, if the second network is activated, the device 100 may receive video data using the previously connected second network.

The device 100 may determine whether to activate the second network, by comparing the calculated buffer duration with the predetermined reference time. For example, the device 100 may deactivate the second network if the buffer duration is greater than the first predetermined time. The first predetermined time may be a reference time for starting playback of the video as a reference for the buffer duration.

In addition, the device 100 may determine whether to activate the second network with reference to the first predetermined time and the second predetermined time based on the buffer duration. The second predetermined time may be a reference time for stopping playback of the video as a reference for the buffer duration.

In addition, the device 100 may use a transmission speed of the first network in an initial buffering operation to quickly determine whether to activate the second network, before receiving the metadata.

In detail, if data starts to be received via the first network, the device 100 may measure of a transmission speed of the first network. The device 100 may determine whether to activate the second network, based on the measured transmission speed of the first network. For example, the device 100 may determine that the second network should be activated if the measured transmission speed of the first network is less than the predetermined reference speed.

The predetermined reference speed may indicate a speed required to receive and play back a seamless video through streaming. For example, the predetermined reference speed may be pre-defined as 2500 Kbits/s. The predetermined reference speed may be pre-defined by taking into account bit rates according to generally used video resolutions.

The device 100 may determine whether to activate the second network based on a transmission speed of the first network in an initial buffering operation, thereby further increasing reception efficiency of video data.

In addition, the device 100 may determine whether to activate the second network based on a connection state, a transmission speed, and a network type of the second network. For example, the device 100 may deactivate the second network if the connection state of the second network is bad or the transmission speed of the second network is slow even after it is determined that the second network should be activated based on the buffer duration or the transmission speed of the second network. In addition, the device 100 may also deactivate the second network if the network type of the second network does not have a transmission speed that is, for example, greater than or equal to that of a 3G network.

If it is determined whether to activate the second network, the device 100 may dynamically adjust the predetermined reference time based on the determination. In detail, the device 100 may decrease the predetermined reference time if the second network is activated and increase the predetermined reference time if the second network is deactivated. The predetermined reference time may include the first reference time and the second reference time.

The device 100 may reduce a possibility of stopping playback of a video by adaptively adjusting the predetermined reference time while receiving video data through streaming and simultaneously playing back a received video. The device 100 may prevent a decrease in quality of the video caused by frequent pauses.

For example, if the second network is activated, the device 100 may reduce the first predetermined time that is a reference time for starting playback of a video and the second predetermined time that is a reference time for stopping playback of the video, thereby reducing stops of playback of the video.

In operation 740, the device 100 may receive video data using at least one of the first network and the second network according to the determination of whether to activate the second network.

In detail, the device 100 may receive video data via the first network and the second network if it is determined that the second network should be activated. The device 100 may play back a seamless video by using both the first network and the second network using the MPTCP to increase a transmission speed of the video data.

In addition, the device 100 may receive video data only via the first network if it is determined that the second network should be deactivated. If only the first network is used since a transmission speed of the first network is sufficient, the video data may be efficiently received in terms of cost.

Figure 8:
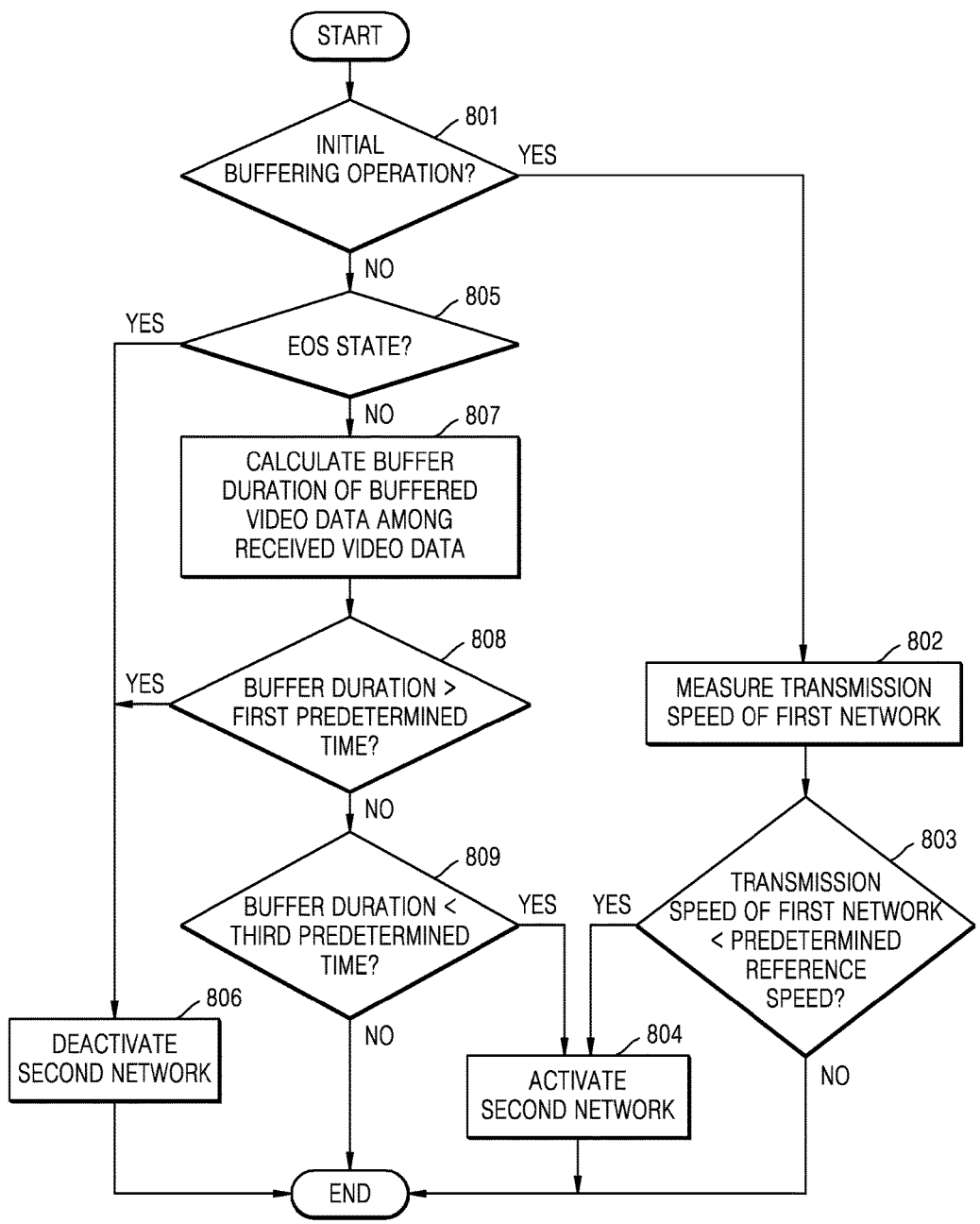
FIG. 8 illustrates a flowchart of a method by which the device receives video data through streaming, according to another exemplary embodiment.

FIG. 8 illustrates a flowchart of a method by which the device 100 receives video data through streaming, according to another exemplary embodiment.

Operations corresponding to those described with reference to FIG. 7 may be omitted from a description of the flowchart of FIG. 8.

In operation 801, the device 100 may determine whether a video playback state corresponds to an initial buffering operation.

The initial buffering operation may be an operation before playback of a video starts. For example, the device 100 may start playback of the video if a buffer duration of video data is greater than or equal to the first predetermined time, and a duration until the buffer duration becomes greater than or equal to the first predetermined time may correspond to the initial buffering operation.

If it is determined that the video playback state corresponds to the initial buffering operation, the device 100 may measure a transmission speed of the first network in operation 802. For example, the device 100 may measure a transmission speed of the first network during reception of metadata of the video.

The device 100 may quickly determine whether to activate the second network in the initial buffering operation by using a transmission speed of the first network.

In detail, in operation 803, the device 100 may compare the measured transmission speed of the first network with the predetermined reference speed.

The predetermined reference speed may indicate a speed required to receive and play back a seamless video through streaming. For example, the predetermined reference speed may be pre-defined as 2500 Kbits/s. The predetermined reference speed may be pre-defined by taking into account bit rates according to generally used video resolutions.

If the measured transmission speed of the first network is less than the predetermined reference speed, the device 100 may determine in operation 804 that the second network should be activated. The device 100 may receive video data via the second network to increase a transmission speed of the video data.

If it is determined in operation 801 that the video playback state does not correspond to the initial buffering operation, the device 100 may determine in operation 805 whether the video playback state is the EOS state. The EOS state indicates an end portion of the video, and information about the EOS state may be included in metadata of video data.

If it is determined that the video playback state is the EOS state, the device 100 may determine in operation 806 that the second network should be deactivated.

If it is determined that the video playback state is not the EOS state, the device 100 may calculate a buffer duration of buffered video data among the received video data in operation 807.

The buffer duration of the video is information about a buffering amount of a buffer for temporarily storing received video data and may indicate a buffering amount calculated according to a time unit. For example, the device 100 may receive information about a bit rate of the video via the first network and calculate the buffer duration of the video by using the received information about the bit rate.

In operation 808, the device 100 may compare the calculated buffer duration with the first predetermined time.

The first predetermined time may be a reference time for starting playback of the video as a reference for the buffer duration.

If the buffer duration is greater than or equal to the first predetermined time, the device may determine in operation 806 that the second network should be deactivated.

If the buffer duration is less than the first predetermined time, the device may compare the buffer duration with the third predetermined time in operation 809.

The third predetermined time may be a reference time for deactivating the second network, and the device 100 may determine the third predetermined time based on the first predetermined time and the second predetermined time. In detail, the third predetermined time may be less than the first predetermined time and greater than the second predetermined time that is a reference time for stopping playback of the video. For example, the third predetermined time may be a mean value of the first predetermined time and the second predetermined time.

If the buffer time is less than or equal to the third predetermined time, the device 100 may determine in operation 804 that the second network should be activated.

If the second network is activated in operation 804, the device 100 may decrease the first predetermined time and the second predetermined time. According to the decrease in the first predetermined time and the second predetermined time, the third predetermined time may also decrease.

If the second network is deactivated in operation 806, the device 100 may increase the first predetermined time and the second predetermined time. According to the increase in the first predetermined time and the second predetermined time, the third predetermined time may also increase.

The device 100 may reduce unnecessary stoppage of playback by adaptively adjusting the predetermined reference time based on the determination of whether to activate the second network, thereby preventing a decrease in quality of the video caused by frequent pauses.

Figure 9:
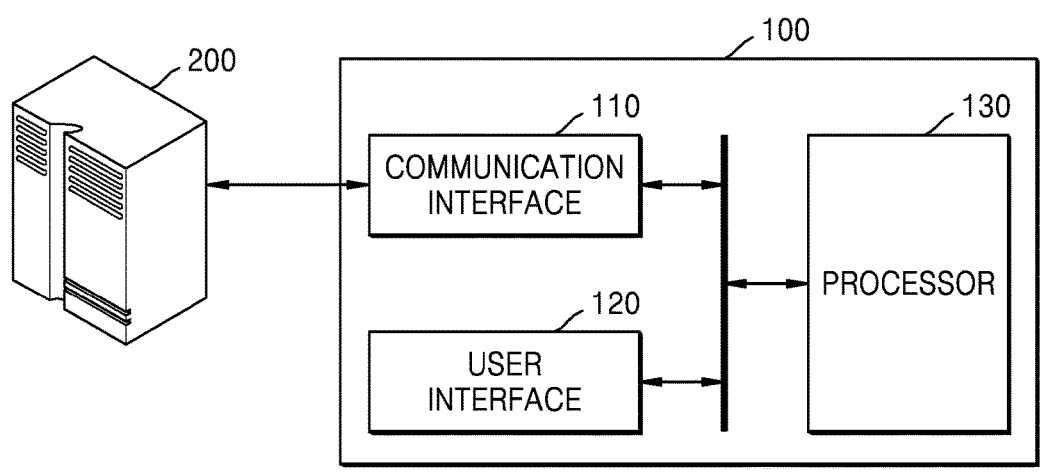
FIG. 9 illustrates a hardware configuration of the device supporting the MPTCP, according to an exemplary embodiment.

FIG. 9 illustrates a hardware configuration of the device 100 supporting the MPTCP, according to an exemplary embodiment.

The device 100 may be one of various types of devices capable of using a wireless network. For example, the device 100 may be implemented by a cellular phone, a smartphone, a laptop computer, a tablet device, an e-book device, a smart TV, a digital broadcast device, a personal digital assistant (PDA), a portable multimedia player (PMP), a navigation, or the like.

Referring to FIG. 9, the device 100 may include a communication interface 110, a user interface 120, and a processor 130.

The communication interface 110 may be a configuration for transmitting and receiving data to and from an external device and may include a short-distance communication module, a wireless communication module, a wired communication module, and the like.

In detail, the communication interface 110 may include a first network interface for accessing the first network which may be, for example, a WLAN such as Wi-Fi, and a second network interface for accessing, for example, a mobile network such as 3G or 4G. In some exemplary embodiments, the communication interface 110 may be a single hardware configuration capable of performing both a function of the first network interface and a function of the second network interface.

In further exemplary embodiments, the communication interface 110 may be implemented by being separated as, for example, a first network interface that is a single hardware configuration for accessing the first network, and a second network interface that is a separate single hardware configuration for accessing the second network.

The communication interface 110 may support the MPTCP. The communication interface 110 may use both the first network and the second network, which may have different IP addresses, by using the MPTCP.

The communication interface 110 may be in a state of accessing the first network and the second network by using the first network interface and the second network interface. In this case, the communication interface 110 may receive data by using the activated first or second network according to whether the first or second network is activated.

In detail, the communication interface 110 may receive data of a video desired to be played back via the first network. The data of the video desired to be played back may include metadata and video data of the video.

In addition, the communication interface 110 may receive the video data by using at least one of the first network and the second network according to whether the second network is activated.

For example, if the second network is activated, the communication interface 110 may receive video data from the server 200 via the first network and the second network. In addition, if the second network is deactivated, the communication interface 110 may receive video data only via the first network.

The user interface 120 may be a configuration for providing information to a user and receiving an input from the user and may include at least one from among a keyboard, a capacitive touchscreen, a resistive touchscreen, a display, a physical button, and the like.

The user interface 120 may display video data received through streaming. In detail, the user interface 120 may receive a signal related to playback or stoppage of a video from the processor 130 and display a playback screen image of the video.

In addition, the user interface 120 may receive an input related to playback or stoppage of the video from the user and display a playback screen image of the video.

The processor 130 may be a configuration implemented by at least one processing unit, such as a central processing unit (CPU), an application processor (AP), and the like, and may perform a function of controlling a general operation of the device 100.

The processor 130 may control the communication interface 110 and the user interface 120 such that the communication interface 110 receives video data from the server 200 through streaming and the user interface 120 plays back a video.

In detail, if a request for playing back a video is received, the processor 130 may control the communication interface 110 to receive video data via the first network.

The processor 130 may control the communication interface 110 to receive metadata and video data as data of a video desired to play back. For example, the processor 130 may control the communication interface 110 to receive the metadata of the video via the first network and to receive the video data immediately after the reception of the metadata.

The processor 130 may calculate a buffer duration of buffered video data among the received video data. The processor 130 may receive information about a bit rate of the video using the first network and calculate the buffer duration of the video by using the received information about the bit rate.

The processor 130 may determine whether to activate the second network based on the calculated buffer duration. For example, the processor 130 may control the communication interface 110 to deactivate the second network if the buffer duration is greater than or equal to the first predetermined time. The first predetermined time may be a reference time for starting playback of the video as a reference for the buffer duration.

In addition, the processor 130 may control the communication interface 110 to activate the second network based on the third predetermined time determined using the first predetermined time and the second predetermined time. The processor 130 may activate the second network if the buffer duration is less than the third predetermined time. The second predetermined time may be a reference time for stopping playback of the video as a reference for the buffer duration.

In addition, the processor 130 may measure a transmission speed of the first network if data (e.g., metadata) of the video starts to be received via the first network, to quickly determine whether to activate the second network.

The processor 130 may determine whether to activate the second network, based on the measured transmission speed of the first network. For example, the processor 130 may control the communication interface 110 to activate the second network if the measured transmission speed of the first network is less than the predetermined reference speed.

The predetermined reference speed may indicate a speed required to receive and play back a seamless video through streaming. For example, the predetermined reference speed may be pre-defined as 2500 Kbits/s. The predetermined reference speed may be pre-defined by taking into account bit rates according to generally used video resolutions.

In addition, if it is determined whether the second network should be activated, the processor 130 may dynamically adjust the predetermined reference time based on the determination. In detail, the processor 130 may decrease the predetermined reference time if the second network is activated and increase the predetermined reference time if the second network is deactivated.

The processor 130 may reduce a possibility of stopping playback of the video by adaptively adjusting the predetermined reference time while receiving video data through streaming and simultaneously playing back a received video. The processor 130 may prevent a decrease in quality of the video caused by frequent pauses.

In addition, the processor 130 may determine whether a video playback state is the EOS state. The EOS state may indicate an end portion of the video, and information about the EOS state may be included in metadata of video data.

If it is determined that the video playback state is the EOS state, the processor 130 may control the communication interface 110 to deactivate the second network.

The processor 130 may control the communication interface 110 to receive video data by using at least one of the first network and the second network according to the determination of whether to activate the second network.

The methods described above may be written as computer programs and may be implemented in general-use digital computers that execute the programs using a non-transitory computer-readable recording medium. In addition, a structure of data used in the methods may be recorded in a non-transitory computer-readable recording medium in various ways. Examples of the non-transitory computer-readable recording medium include storage media such as magnetic storage media (e.g., ROM, floppy disks, hard disks, etc.) and optical recording media (e.g., CD-ROMs, or DVDs).

According to one or more exemplary embodiments, a device supporting a MPTCP may play back a video in a streaming manner by receiving the video using heterogeneous networks. The device may efficiently reduce the use of a charged mobile data network among the heterogeneous networks while playing back a high-quality seamless video, thereby saving a charge or cost.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method for receiving video data through streaming using a device supporting a multipath transport control protocol (MPTCP), the method comprising:
   receiving a part of the video data through a first network;
   while receiving the part of the video data, calculating a first buffer duration by measuring playback time of buffered video data from among the received part of the video data;
   making a first determination regarding whether to activate a second network based on comparing the calculated first buffer duration with a predetermined reference time;
   based on the first determination to activate the second network, activating the second network, receiving a remaining part of the video data through both of the first network and the network, and adjusting the predetermined reference time;
   while receiving the remaining part of the video data, calculating a second buffer duration of the buffered video data,
   making a second determination regarding whether to deactivate the second network based on comparing the calculated second buffer duration with the adjusted predetermined reference time; and
   based on the second determination to deactivate the second network, deactivating the second network, receiving the remaining part of the video data through the first network, and adjusted prefetermined reference time:
   wherein the adjusting of the predetermined reference time comprises:
      if the second network is activated, decreasing the predetermined reference time, and
      if the second network is deactivated, increasing the predetermined reference time, and
   wherein the predetermined reference time indicates an amount of the playback time which is required for playback of the video data to be started.

2. The method of claim 1, wherein the determining of whether to activate the second network comprises determining not to activate the second network if the calculated first buffer duration is greater than the predetermined reference time.

3. The method of claim 1, wherein the predetermined reference time comprises a first predetermined reference time,
   wherein the determining of whether to activate the second network comprises determining to activate the second network based on the first predetermined reference time and a second predetermined reference time associated with the calculated first buffer duration, and
   wherein the second predetermined reference time indicates an amount of buffer duration at which playback of the video data is to be stopped.

4. The method of claim 1, further comprising receiving information about a bit rate of the video data through the first network,
   wherein the calculating of the first buffer duration comprises calculating the first buffer duration of the received part of the video data using the received information about the bit rate.

5. The method of claim 1, further comprising:
   measuring a transmission speed of the first network when the video data starts to be received through the first network; and
   determining of whether to activate the second network based on the measured transmission speed of the first network.

6. The method of claim 5, wherein the determining of whether to activate the second network based on the measured transmission speed of the first network comprises determining to activate the second network if the measured transmission speed of the first network is less than a predetermined reference speed.

7. A non-transitory computer-readable recording medium having recorded thereon a computer-readable program for performing the method of claim 1.

8. A device supporting a multipath transport control protocol (MPTCP), the device comprising:
   a communication interface configured to receive video data streamed through a first network; and
   a processor configured to:
      while receiving a part of the video data through streaming, calculate a first buffer duration by measuring playback time of buffered video data from among the received part of the video data,
      make a first determination regarding whether to activate a second network based on comparing the calculated first buffer duration with a predetermined reference time,
      based on the first determination to activate the second network, activate the second network, control the communication interface to receive a remaining part of the video data through both of the first network and the second network, and adjust the predetermined reference time,
      while receiving the remaining part of the video data, calculate a second buffer duration of the buffered video data;
      make a second determination regarding whether to deactivate the second network based on comparing the calculated second buffer duration with the adjusted predetermined reference time; and
      based on the second determination to deactivate the second network, deactivate the second network, control the communication interface to receive the remaining part of the video data through the first network, and adjust the adjusted predetermined reference time,
   wherein the processor is configured to:
      if the second network is activated, decrease the predetermined reference time, and
      if the second network is deactivated, increase the predetermined reference time, wherein the predetermined reference time indicates an amount of the playback time which is required for playback of the video data to be started.

9. The device of claim 8, wherein the processor is further configured to determine not to activate the second network if the calculated first buffer duration is greater than the predetermined reference time.

10. The device of claim 8, wherein the predetermined reference time comprises a first predetermined reference time,
wherein the processor is further configured to determine to activate the second network based on the first predetermined reference time and a second predetermined reference time associated with the calculated first buffer duration, and
wherein the second predetermined reference time indicates an amount of buffer duration at which playback of the video data is to be stopped.

11. The device of claim 8, wherein the communication interface is further configured to receive information about a bit rate of the video data, and
the processor is further configured to calculate the first buffer duration of the received part of the video data using the received information about the bit rate.

12. The device of claim 8, wherein the processor is further configured to measure a transmission speed of the first network when the video data starts to be received through the first network, and determine whether to activate the second network based on the measured transmission speed.

13. The device of claim 12, wherein the processor is further configured to determine to activate the second network if the measured transmission speed is less than a predetermined reference speed.

14. A device supporting a multipath transport control protocol (MPTCP), the device comprising:
a communication interface configured to receive video data streamed through a first network; and
a processor configured to activate a second network based on comparison between a buffer duration of buffered video data from among the received video data and a first predetermined time, and to control the communication interface to receive the video data using both of the first network and the second network, wherein the first predetermined time indicates an amount of playback time which is required for playback of the video data to be started,
wherein the buffer duration is calculated by measuring a real-time amount of buffered video data,
wherein, according to receiving the video data, based on the buffer duration being increased, the processor is further configured to deactivate the second network and control the communication interface to receive the video data through the first network, and wherein, according to playing the video data, based on the buffer duration being decreased, the processor is further configured to reactivate the second network and control the communication interface to receive the video data through the first network and the second network.

15. The method of claim 1, wherein the receiving the video data by using both of the first network and the second network comprises receiving the video data through the first network and simultaneously receiving the video data through the second network.

16. The method of claim 1, wherein the method further comprises:
calculating a third buffer duration of the buffered video data;
making a third determination regarding whether to reactivate the second network based on the calculated third buffer duration; and
reactivating the second network and receiving the video data by using both of the first network and the second network, according to a result of the third determination.

17. The method of claim 16, wherein the third determination comprises comparing the calculated third buffer duration with the adjusted predetermined reference time.

18. The method of claim 1, wherein, according to playing the part of the video data, based on the calculated second buffer duration being decreased, the second network is reactivated and the predetermined reference time is adjusted and the remaining part of the video data is received through the first network and the second network.

19. The method of claim 1, wherein the part of the video data comprises a first part of the video data, and the remaining part of the video data comprises a second part of the video data, and
wherein after receiving the second part of the video data, based on the calculated second buffer duration being increased, the second network is deactivated and the predetermined reference time is adjusted and a third part of the video data is received through the first network.

20. The method of claim 1, wherein the adjusting of the predetermined reference time further comprises:
if the second network is reactivated after being deactivated, decreasing the predetermined reference time.

* * * * *